US010676322B2

(12) United States Patent
Hayashi

(10) Patent No.: US 10,676,322 B2
(45) Date of Patent: Jun. 9, 2020

(54) DRIP-PROOF DEVICE FOR PASSENGER CONVEYOR

(71) Applicant: Mitsubishi Electric Corporation, Tokyo (JP)

(72) Inventor: Yuji Hayashi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 16/610,523

(22) PCT Filed: Jun. 21, 2017

(86) PCT No.: PCT/JP2017/022857
§ 371 (c)(1),
(2) Date: Nov. 4, 2019

(87) PCT Pub. No.: WO2018/235196
PCT Pub. Date: Dec. 27, 2018

(65) Prior Publication Data
US 2020/0148509 A1 May 14, 2020

(51) Int. Cl.
*B65G 23/00* (2006.01)
*B66B 23/00* (2006.01)
*B66B 31/00* (2006.01)

(52) U.S. Cl.
CPC .............. *B66B 23/00* (2013.01); *B66B 31/00* (2013.01)

(58) Field of Classification Search
CPC ................................ B66B 23/00; B66B 31/00
See application file for complete search history.

(56) References Cited

U.S. PATENT DOCUMENTS 4,299,321 A * 11/1981 Hermawan ............. B66B 21/10 104/25
9,487,379 B2 * 11/2016 Dong ...................... B66B 23/00
2020/0087117 A1 * 3/2020 Turek ...................... B66B 23/12

FOREIGN PATENT DOCUMENTS

JP 2008-239331 A 10/2008
JP 2012-188268 A 10/2012

OTHER PUBLICATIONS

International Search Report and Written Opinion dated Aug. 22, 2017 for PCT/JP2017/022857 filed on Jun. 21, 2017, 8 pages including English Translation of the International Search Report.

* cited by examiner

*Primary Examiner* — Gene O Crawford
*Assistant Examiner* — Keith R Campbell
(74) *Attorney, Agent, or Firm* — Xsensus LLP

(57) ABSTRACT

Provided is a drip-proof device for a passenger conveyer, which is capable of improving working efficiency of maintenance work performed in a machine room. The drip-proof device for a passenger conveyor includes gutters, which are provided to a floor plate for opening and closing an opening portion of a machine room, and are each configured to receive water passing through a gap between wall surfaces of the opening portion and the floor plate, and a gutter displacement device configured to displace the gutters. Each of the gutters is displaced between a water-receiving position for receiving the water passing through the gap and a receiving position for allowing removal of the floor plate through the opening portion. The gutter displacement device includes a rotary member configured to rotate through an operation of the rotary member- and rods configured to displace the gutters through the rotation of the rotary member.

8 Claims, 7 Drawing Sheets

DRIP-PROOF DEVICE FOR PASSENGER CONVEYOR

CROSS-REFERENCE TO RELATED APPLICATIONS

The present application is based on PCT filing PCT/JP2017/022857, filed Jun. 21, 2017, the entire contents of which are incorporated herein by reference.

TECHNICAL FIELD

The present invention relates to a drip-proof device for a passenger conveyor, which includes gutters configured to receive water having intruded into a machine room through an opening portion.

BACKGROUND ART

Hitherto, there is known a drip-proof device for an escalator, which is to be mounted to an escalator including a machine room having an opening portion for allowing entry and exit of a maintenance worker and a floor plate for opening and closing the opening portion. The drip-proof device for an escalator is mounted in the machine room, and includes gutters configured to receive water having intruded into the machine room through the opening portion so as to prevent water having intruded into the machine room from dripping in the machine room (for example, see Patent Literature 1).

CITATION LIST

Patent Literature

[PTL 1] JP 2008-239331 A

SUMMARY OF INVENTION

Technical Problem

However, the gutters are mounted in the machine room, with the result that a working space for the maintenance worker is reduced. In order to expand the working space, the gutters are required to be removed from the machine room. Thus, there is a problem in that working efficiency of maintenance work performed by the maintenance worker in the machine room is low.

The present invention has been made to solve the problem described above, and has an object to provide a drip-proof device for a passenger conveyor, which is capable of improving working efficiency of maintenance work performed in a machine room.

Solution to Problem

According to one embodiment of the present invention, there is provided a drip-proof device for a passenger conveyor, including: a gutter, which is provided to a floor plate for opening and closing an opening portion of a machine room, and is configured to receive water passing through a gap between a wall surface of the opening portion and the floor plate, wherein the gutter is displaced between a water-receiving position for receiving the water passing through the gap and a receiving position for allowing removal of the floor plate through the opening portion.

Advantageous Effects of Invention

With the drip-proof device for a passenger conveyor according to one embodiment of the present invention, when the floor plate is removed from the machine room to open the opening portion, the gutter is moved together with the floor plate. Thus, work for removing the gutter from the machine room after removal of the floor plate from the machine room is not required. As a result, working efficiency of maintenance work performed in the machine room can be improved.

DESCRIPTION OF EMBODIMENT

First Embodiment

Figure 1:
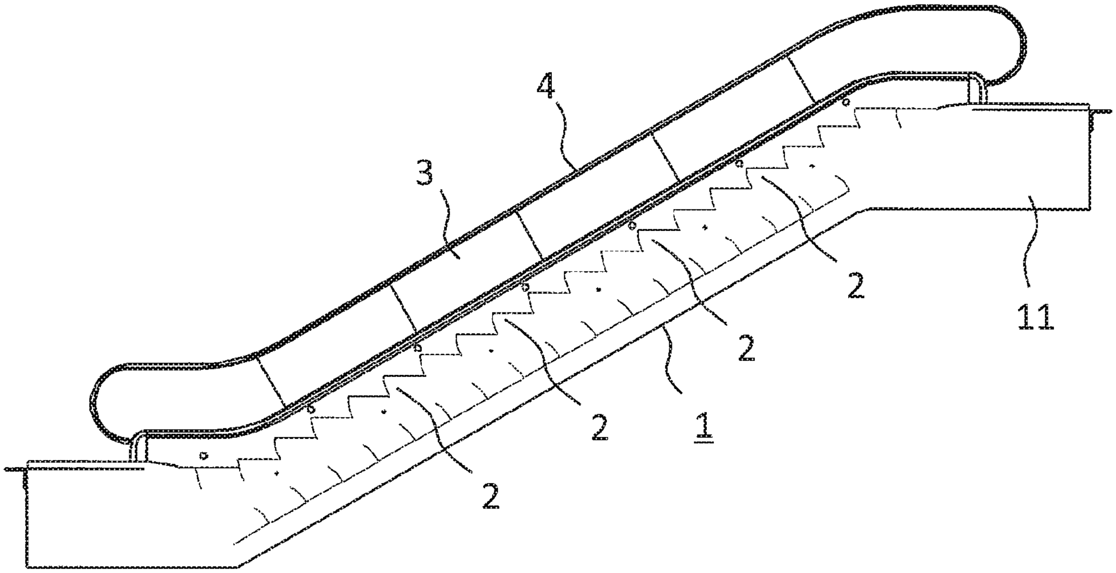
FIG. 1 is a side view for illustrating an escalator according to a first embodiment of the present invention.

FIG. 1 is a side view for illustrating an escalator according to a first embodiment of the present invention. The escalator, which is a passenger conveyor, includes a main frame 1, a plurality of footsteps 2, a pair of balustrades 3, and a pair of moving handrails 4. The main frame 1 is provided between an upper floor and a lower floor. The plurality of footsteps 2 are circulated between the upper floor and the lower floor. The pair of balustrades 3 are provided so as to be apart from each other in a width direction of the main frame 1, and are each provided vertically on the main frame 1. The moving handrails 4 are provided to the balustrades 3, respectively, and are circulated between the upper floor and the lower floor in conjunction with the footsteps 2.

Figure 2:
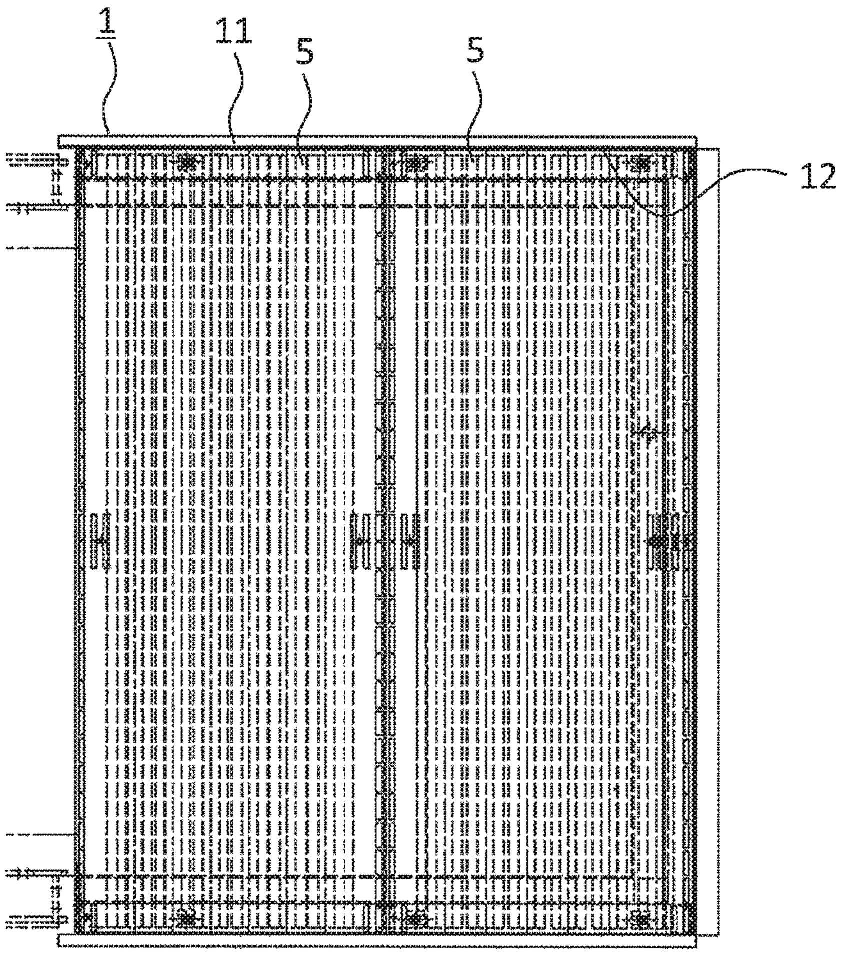
FIG. 2 is a plan view for illustrating part inside a main frame of FIG. 1, which is adjacent to an upper floor.

In part inside the main frame 1, which is adjacent to the upper floor, a machine room 11 is formed. FIG. 2 is a plan view of the part inside the main frame 1 of FIG. 1, which is adjacent to the upper floor. The machine room 11 has an opening portion 12 for allowing entry and exit of a maintenance worker. Further, the escalator includes a plurality of floor plates 5 for opening and closing the opening portion 12. In this example, two floor plates 5 are arranged side by side in a longitudinal direction of the main frame 1.

Figure 3:
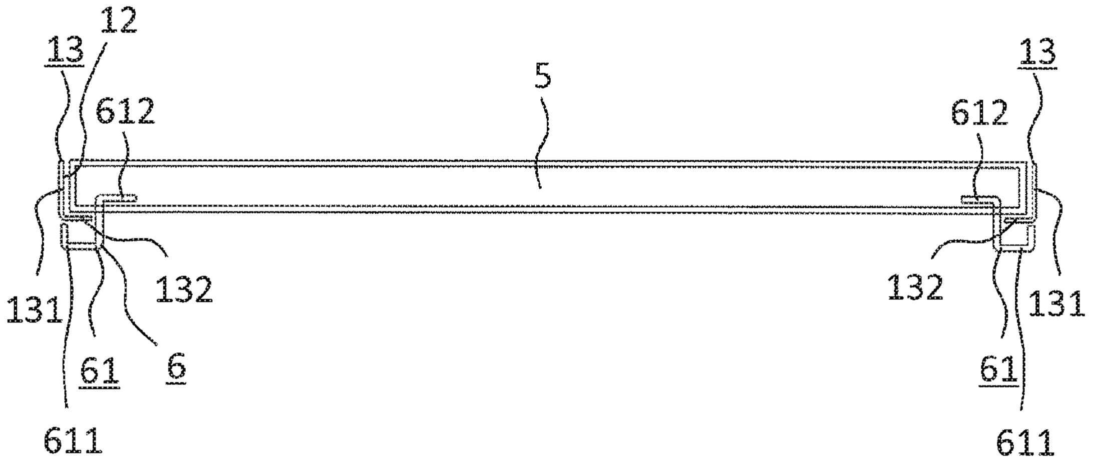
FIG. 3 is a side view for illustrating a floor plate of FIG. 2.

FIG. 3 is a side view for illustrating the floor plate 5 of FIG. 2. The escalator further includes a drip-proof device 6. The drip-proof device 6 for an escalator includes a pair of gutters 61, which are provided at both ends of the floor plate 5 in a width direction of the floor plate 5. Each wall surface of the opening portion 12 is formed by a side joint 13. Both ends of the floor plate 5 in the width direction are supported by a pair of side joints 13, respectively.

Each of the side joints 13 is formed to have an L-shaped cross section. The side joint 13 forms the wall surface of the opening portion 12, which is oriented in the width direction. The side joint 13 has a vertical plate portion 131 and a horizontal plate portion 132. The vertical plate portion 131 extends in a height direction. The horizontal plate portion 132 extends inward from a lower end of the vertical plate portion 131 in the width direction of the opening portion 12. The vertical plate portion 131 is arranged so as to be opposed to a side surface of the floor plate 5. The horizontal plate portion 132 is arranged so as to be opposed to an end of a bottom surface of the floor plate 5 in the width direction.

Each of the gutters 61 includes a gutter main body 611 and a gutter support portion 612. The gutter main body 611 has a U-like shape, and is provided below the side joint 13. The gutter support portion 612 is formed so as to extend upward from the gutter main body 611 beyond the horizontal plate portion 132, and is configured to support the gutter main body 611. When the floor plate 5 closes the opening portion 12 and maintenance work is not performed by a maintenance worker, the gutter main body 611 is arranged below a distal end of the horizontal plate portion 132 so as to cover the distal end of the horizontal plate portion 132 in the width direction. With this arrangement, water passing through a gap between the side joint 13 and the floor plate 5 is received in the gutter main body 611.

Figure 4:
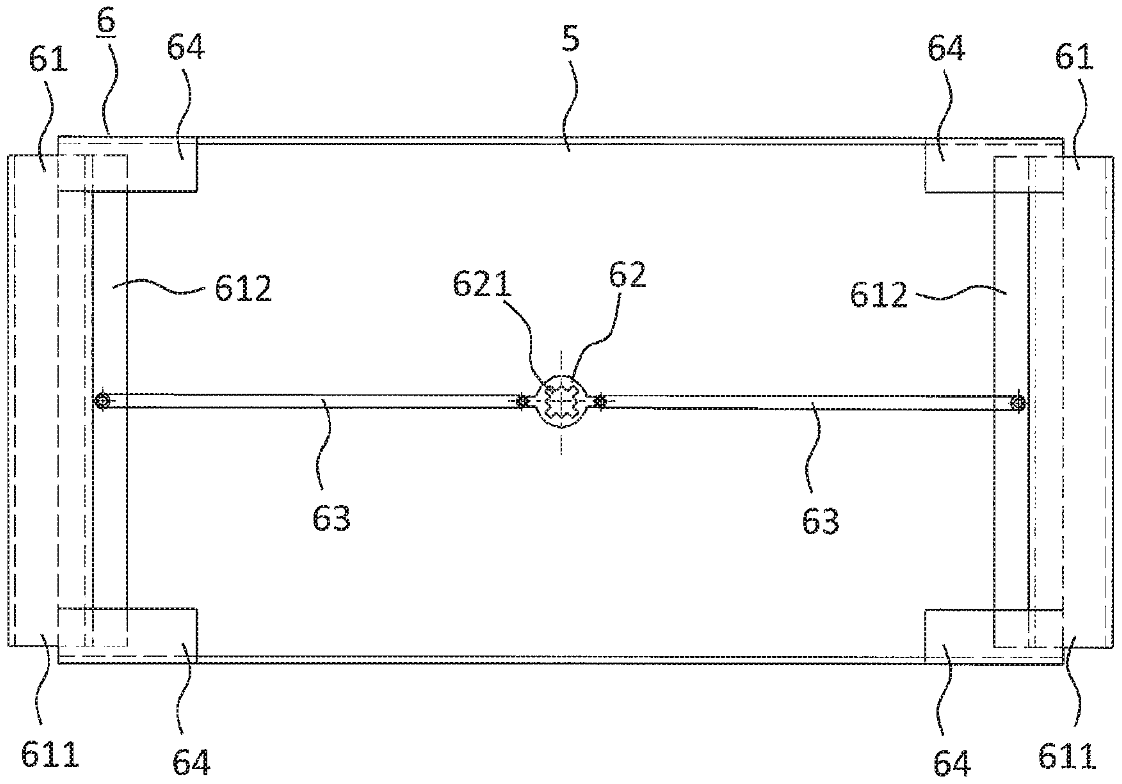
FIG. 4 is a bottom view for illustrating a drip-proof device of FIG. 3.

FIG. 4 is a bottom view for illustrating the drip-proof device 6 of FIG. 3. The drip-proof device 6 for an escalator further includes a rotary member 62, a pair of rods 63, and guides 64. The rotary member 62 is provided to the floor plate 5, and is rotated about an axial line extending in a direction perpendicular to a tread of the floor plate 5. The pair of rods 63 are connected to the rotary member 62 and each of the pair of gutters 61. The guides 64 are provided to the floor plate 5, and are configured to guide the gutters 61. The rotary member 62, the rods 63, and the guides 64 form a gutter displacement device configured to displace the gutters 61.

The rotary member 62 is arranged at a center of the floor plate 5 when the floor plate 5 is viewed from above. The rotary member 62 has an insertion hole 621 extending in a height direction. The insertion hole 621 is formed in a rectangular shape, which has additional spaces, each projecting from a center of each of sides of the rectangular shape.

The pair of rods 63 are connected to portions of the rotary member 62, which lie on a diagonal line. One of the pair of rods 63 is connected to the gutter supporting portion 612 of one of the pair of gutters 61, and another one of the rods 63 is connected to the gutter supporting portion 612 of another one of the gutters 61.

The guides 64 are provided at both ends of the floor plate 5 in the width direction and both ends of the floor plate 5 in a depth direction. The guides 64 support the gutter main bodies 611 of the gutters 61 from below. The guides 64 guide the gutters 61 so that the gutters 61 are movable in the width direction of the floor plate 5.

Figure 5:
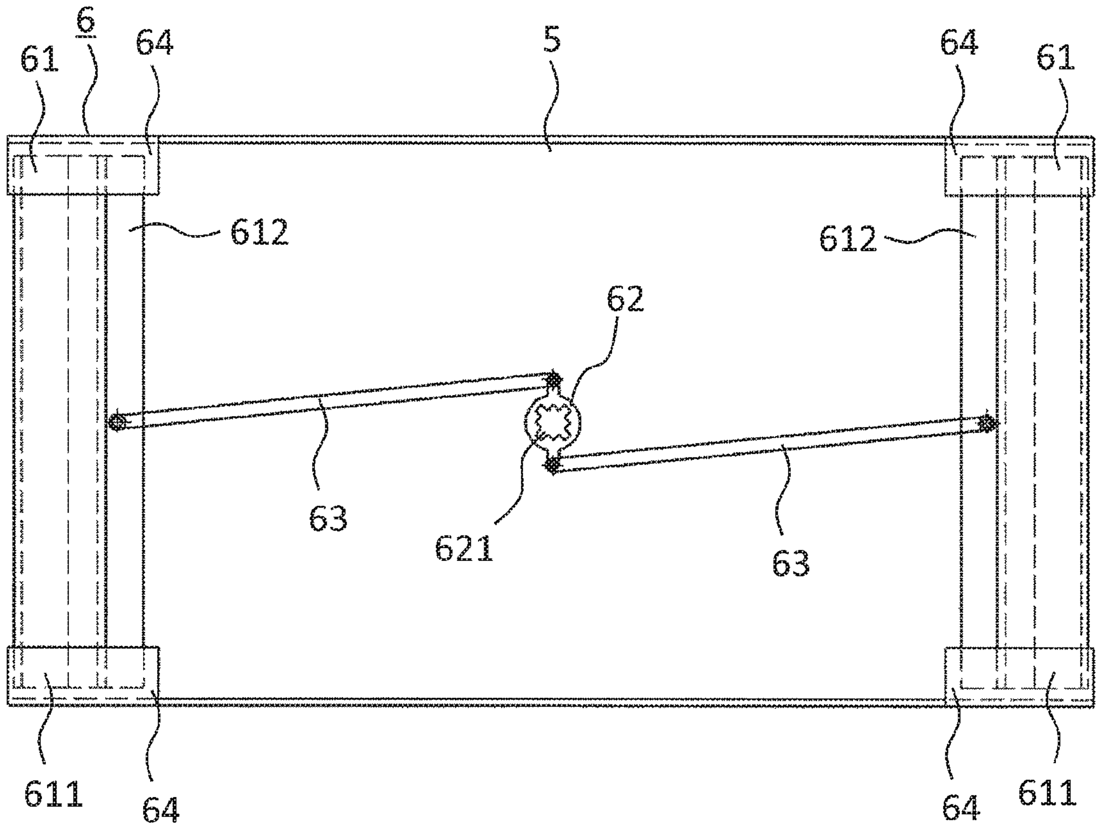
FIG. 5 is a view for illustrating a state in which gutters are displaced in the drip-proof device of FIG. 4.

FIG. 5 is a view for illustrating a state after the gutters 61 are displaced in the drip-proof device 6 of FIG. 4. Each of the gutters 61 is displaced, through movement in the width direction of the floor plate 5, between a water-receiving position for receiving water passing through the gap between the side joint 13 and the floor plate 5 and a receiving position for allowing removal of the floor plate 5 through the opening portion 12. The rotary member 62 is configured to rotate through the operation of the rotary member 62. The rods 63 are configured to displace the gutters 61 through the rotation of the rotary member 62.

As illustrated in FIG. 4, when part of the gutter 61 projects outward in the width direction with respect to the guides 64, the gutter 61 is positioned in the water-receiving position. Meanwhile, as illustrated in FIG. 5, when the whole gutter 61 is located on an inner side of the guides 64 in the width direction, the gutter 61 is positioned in the receiving position. When the gutter 61 is positioned in the receiving position, the gutter main body 611 is arranged on an inner side of the horizontal plate portion 132 of the side joint 13 in the width direction. As a result, the floor plate 5 can be removed through the opening portion 12. Meanwhile, when the gutter 61 is positioned in the water-receiving position, the gutter main body 611 is arranged below the distal end of the horizontal plate portion 132 of the side joint 13 so as to cover the distal end of the horizontal plate portion 132 in the width direction. In this case, the floor plate 5 cannot be removed through the opening portion 12. Further, in this case, water passing through the gap between the side joint 13 and the floor plate 5 is received by the gutter 61. In other words, the gutter 61 receives the water passing through the gap between the wall surface of the opening portion 12 and the floor plate 5. As a result, water having intruded into the machine room 11 can be prevented from dripping in the machine room 11.

Figure 6:
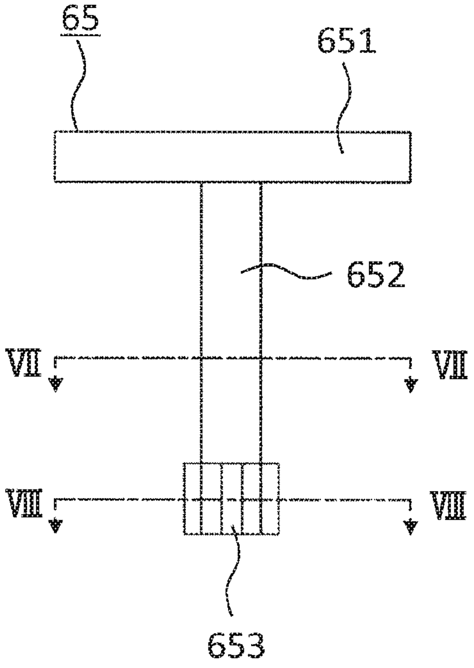
FIG. 6 is a view for illustrating a handle to be inserted into an insertion hole of FIG. 4.

FIG. 6 is a view for illustrating a handle to be inserted into the insertion hole 621 of FIG. 4. The drip-proof device 6 for an escalator further includes a handle 65 configured to rotate the rotary member 62. The handle 65 includes a handgrip portion 651, a shaft portion 651, and a distal end portion 653. The shaft portion 651 has one end connected to the handgrip portion 651. The distal end portion 653 is connected to another end of the shaft portion 652.

Figure 7:
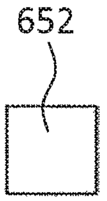
FIG. 7 is a sectional view taken along the line VII-VII of FIG. 6 when viewed in the direction of the arrows.
Figure 8:
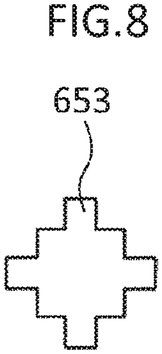
FIG. 8 is a sectional view taken along the line VIII-VIII of FIG. 6 when viewed in the direction of the arrows.

FIG. 7 is a sectional view taken along the line VII-VII of FIG. 6 when viewed in the direction of the arrows. FIG. 8 is a sectional view taken along the line VIII-VIII of FIG. 6 when viewed in the direction of the arrows. A sectional shape of the shaft portion 652 is rectangular. The distal end portion 653 is formed to have a rectangular sectional shape having projecting portions, each projecting outward from a center of each of the sides of the rectangular shape. The distal end portion 653 can be inserted into the insertion hole 621 of the rotary member 62. Through rotation of the handle 65 under a state in which the distal end portion 653 is inserted in the insertion hole 621, as illustrated in FIG. 4 and FIG. 5, the rotary body 62 is rotated to displace the gutters 61 between the water-receiving positions and the receiving positions. The handle 65 is mountable to and removable from the rotary body 62.

Figure 9:
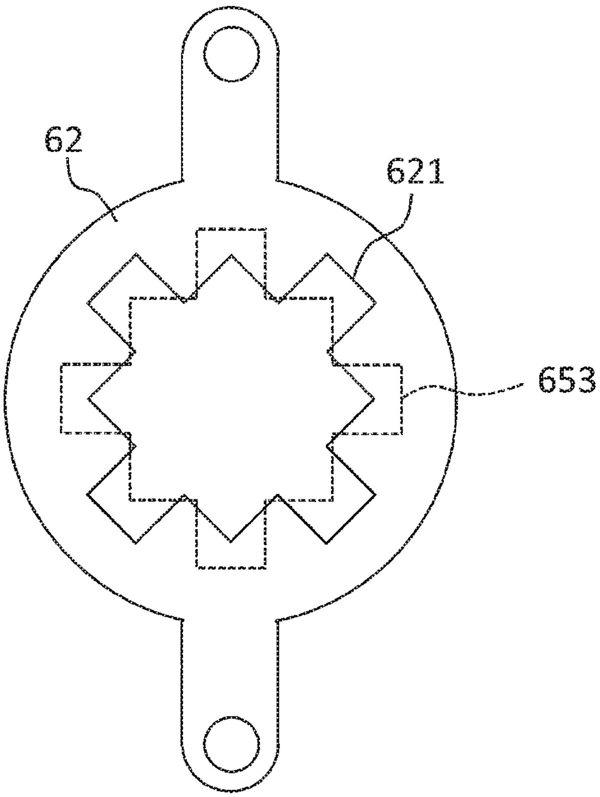
FIG. 9 is a plan view for illustrating a rotary member and a distal end portion when the handle of FIG. 6 is rotated after being inserted into the insertion hole of FIG. 4.

FIG. 9 is a plan view for illustrating the rotary member 62 and the distal end portion 653 when the handle 65 of FIG. 6 is rotated after the handle 65 is inserted into the insertion hole 621 of FIG. 4. When the handgrip portion 651 is rotated under a state in which the distal end portion 653 passes through the insertion hole 621 and the shaft portion 652 is inserted into the insertion hole 621, the shaft portion 652 is rotated in conjunction with the rotation of the handgrip portion 651 to displace the gutters 61 from the water-receiving positions to the receiving positions. At this time, the distal end portion 653 is not rotated. Thus, the distal end portion 653 can support the rotary member 62 from below. When the handle 65 is pulled upward under the above-mentioned state, the floor plate 5 and the gutters 61 are pulled up together with the handle 65.

As described above, the drip-proof device 6 for an escalator according to the first embodiment of the present invention includes the gutters 61, which are provided to the floor plate 5 for opening and closing the opening portion 12 of the machine room 11, and are configured to receive water passing through the gaps between the wall surfaces of the opening portion 12 and the floor plate 5. Each of the gutters 61 is displaced between the water-receiving position for receiving water passing through the gap between the wall surface of the opening portion 12 and the floor plate 5 and the receiving position for allowing the removal of the floor plate 5 through the opening portion 12. Thus, when the floor plate 5 is removed from the machine room 11 to open the opening portion 12, the gutters 61 are moved together with the floor plate 5. As a result, work for removing the gutters 61 from the machine room 11 after the removal of the floor plate 5 from the machine room 11 is not required. As a result, working efficiency of maintenance work performed in the machine room 11 can be improved. Further, the gutters 61 are removed from the machine room 11. Hence, when the maintenance work is performed, the machine room 11 is expanded. As a result, the working efficiency of the maintenance work can be improved.

Further, the drip-proof device 6 for an escalator further includes the gutter displacement device configured to displace the gutters 61. Thus, when the maintenance work is performed, the gutters 61 can easily be displaced.

Further, the gutter displacement device includes the rotary member 62 configured to rotate through the operation of the rotary member 62 and the rods 63 configured to displace the gutters 61 through the rotation of the rotary member 62. Thus, with the rotation of the rotary member 62, the gutters 61 can easily be displaced.

Further, the gutter displacement device further includes the guides 64 configured to guide the gutters 61. Thus, the gutters 61 can more reliably be displaced.

Further, the gutter displacement device further includes the handle 65 configured to rotate the rotary member 62. Thus, through the rotation of the handle 65 by the maintenance worker, the gutters 61 can easily be displaced.

Further, the handle 65 is mountable to and removable from the rotary member 62. Thus, the handle 65 can be mounted to the rotary member 62 only when the gutters 61 are to be displaced.

In the first embodiment described above, description is made of the configuration in which the rotary member 62 is rotated through the operation of the handle 65 by the maintenance worker. However, the rotary member 62 may be rotated with use of a power generating device, such as a motor, configured to generate a force.

Further, in the first embodiment described above, description is made of the configuration in which the machine room 11 is formed in the part inside the main frame 1, which is adjacent to the upper floor, and the opening portion 12 of the machine room 11 is opened and closed by the floor plate 5. The drip-proof device 6 configured to receive water passing through the gaps between the wall surfaces of the opening portion 12 and the floor plate 5. However, the drip-proof device 6 may also have the following configuration. Specifically, a machine room may be formed in part inside the main frame 1, which is adjacent to the lower floor. An opening portion of the machine room may be opened and closed by a floor plate. The drip-proof device 6 may be configured to receive water passing through gaps between wall surfaces of the opening portion and the floor plate.

Further, in the first embodiment described above, description is made of the drip-proof device 6 for an escalator. However, the drip-proof device of the present invention is not limited thereto, and may also be, for example, a drip-proof device for a moving walkway.

REFERENCE SIGNS LIST

1 main frame, 2 footstep, 3 balustrade, 4 moving handrail, 5 floor plate, 6 drip-proof device, 11 machine room, 12 opening portion, 13 side joint, 61 gutter, 62 rotary member, 63 rod, 64 guide, 65 handle, 131 vertical plate portion, 132 horizontal plate portion, 611 gutter main body, 612 gutter support portion, 621 insertion hole, 651 handgrip portion, 652 shaft portion, 653 distal end portion

The invention claimed is:

1. A drip-proof device for a passenger conveyor, comprising:

a gutter, which is provided to a floor plate for opening and closing an opening portion of a machine room, and is configured to receive water passing through a gap between a wall surface of the opening portion and the floor plate, wherein the gutter is displaced between a water-receiving position for receiving the water passing through the gap and a receiving position for allowing removal of the floor plate through the opening portion.

2. The drip-proof device for a passenger conveyor according to claim 1, further comprising a gutter displacement device configured to displace the gutter.

3. The drip-proof device for a passenger conveyor according to claim 2, wherein the gutter displacement device includes a rotary member configured to rotate through an operation of the rotary member and a rod configured to displace the gutter through the rotation of the rotary member.

4. The drip-proof device for a passenger conveyor according to claim 3, wherein the gutter displacement device further includes guide configured to guide the gutter.

5. The drip-proof device for a passenger conveyor according to claim 3, wherein the gutter displacement device further includes a handle configured to rotate the rotary member.

6. The drip-proof device for a passenger conveyor according to claim 5, wherein the handle is mountable to and removable from the rotary member.

7. The drip-proof device for a passenger conveyor according to claim 4, wherein the gutter displacement device further includes a handle configured to rotate the rotary member.

8. The drip-proof device for a passenger conveyor according to claim 7, wherein the handle is mountable to and removable from the rotary member.

* * * * *